United States Patent Office 3,039,986
Patented June 19, 1962

3,039,986
PROCESS FOR PREPARING COATING COMPOSITION CONTAINING A VINYLIDENE CHLORIDE RESIN
Charles Allen Blood, Jr., Buffalo, and John Richard Fisher, Cheektowaga, N.Y., assignors to E. I. du Pont de Nemours and Company, Wilmington, Del., a corporation of Delaware
No Drawing. Filed Oct. 28, 1958, Ser. No. 769,989
5 Claims. (Cl. 260—32.8)

This invention relates to films and film coating. More particularly, it relates to the preparation of vinylidene chloride copolymer compositions for coating regenerated cellulose film.

The use of coatings of organic solvent-soluble vinylidene chloride copolymers, such as copolymers of vinylidene chloride with acrylonitrile, is known for imparting moisture resistance, heat-sealability and durability to regenerated cellulose films. However, these coatings compositions tend to be hazy and, after being applied to the film and dried, tend to impart "blush" to the film.

It is an object of the present invention to eliminate these problems. A further object is to provide a process for preparing a clear vinylidene chloride copolymer coating solution; a vinylidene chloride copolymer coating composition that, when coated on a film, does not affect the film adversely. Other objects will appear hereinafter.

The objects are accomplished by forming a slurry in toluene of a copolymer obtained from 80–95% vinylidene chloride and 5–20% of at least one other polymerizable monomer at a temperature of 0°–50° C., preferably at about 30° C.; heating the slurry to a temperature of 60°–85° C., preferably 70°–80° C.; maintaining the slurry at this temperature of 60°–85° C. for 5–60 minutes, preferably for about 20 minutes; adding methyl ethyl ketone at a temperature of at least 65° C. to the slurry and agitating the mixture, preferably for at least 5 minutes.

The process is particularly useful in preparing vinylidene chloride copolymer compositions containing, in addition to the copolymer, 0.2–1.0% of a fatty acid containing from 16–18 carbon atoms, 0.05–2.0% of finely divided calcium carbonate and 0.2–1.0% of an ester wax, all percentages based on the weight of the copolymer.

The following examples are intended to bring out the critical limitations of the present invention. Unless otherwise stated, parts and percentages are by weight.

EXAMPLE I

A powdered 91.5 vinylidene chloride/8.5 acrylonitrile copolymer (147.9 parts) was mixed with toluene (298.2 parts) at a temperature of 30° C. After agitation, the resulting slurry was heated to a temperature of 70° C. and held at that temperature for 20 minutes. Methyl ethyl ketone (553.9 parts), heated to 70° C., was then added to the slurry. A clear solution resulted. The percent light transmission of the solution, as measured with a Klett-Summerson filter photometer was 96%. The minimum acceptable percent light transmission for preparing satisfactorily coated film is 92%.

The solution was coated on regenerated cellulose film 0.001" thick at the rate of 4.5 grams solids/square meter to provide a clear, transparent coating.

As one control, Control A, powdered vinylidene chloride/acrylonitrile copolymer was slurried in the toluene at 30° C. without heating to 70° C. as in the example for 20 minutes. Methyl ethyl ketone heated to 70° C. was then added to the slurry. A poor appearing solution having particles suspended therein resulted. This poor appearance persisted even after the mixture was heated to 70° C. for a period of 22 minutes. The percent light transmission was 87%.

As a second control, Control B, the above copolymer was slurried in toluene at a temperature of 60° C. instead of 30° C. as in the example and then heated to 70° C. where it was held for 20 minutes. Thereafter, the methyl ethyl ketone at 70° C. was added. The percent light transmission was erratic, averaging about 90%, and the dispersion displayed gel particles.

As third control, Control C, the procedure was repeated except that the toluene-copolymer slurry was held at 70° C. for 95 minutes instead of 20 minutes as in the example before the methyl ethyl ketone at 70° C. was added. The percent light transmission gradually dropped to 89%, indicating that the slurry should not be held at 70° C. for more than one hour before adding the hot methyl ethyl ketone.

As a fourth control, Control D, the copolymer was slurried in 70° C. toluene and then mixed with methyl ethyl ketone at 70° C. The percent light transmission averaged about 91% with numerous gel particles present.

The next three examples are presented to establish the operable limits of the process.

EXAMPLE II

The procedure of Example I was repeated except that the initial toluene temperature was 50° C. instead of 30° C. The percent light transmission of the resulting solution averaged 95%.

EXAMPLE III

The procedure of Example I was repeated. However, after the copolymer was slurried in toluene at 30° C., the slurry was heated to 80° C. instead of to 70° C. The toluene slurry was held at a temperature of 81–84° C. for 20 minutes. Thereafter, the methyl ethyl ketone at a temperature of 70° C. was added. A clear solution resulted having an average percent light transmission of 97%.

EXAMPLE IV

The procedure of Example I was again repeated substantially. The aforementioned copolymer was added to toluene at a temperature of 30° C. The resulting slurry was then heated to 68°–70° C. in approximately 8 minutes. However, the slurry was held at this temperature for only 5 minutes instead of 20 minutes and then the methyl ethyl ketone at 70° C. was added. The percent light transmission of the solution averaged 95.5%.

The results of the examples and the controls are summarized in the following table, Table 1. The critical limitations of the present invention appear in the parentheses.

Table 1
SUMMARY OF RESULTS [1]

| Example | Initial Toluene Temp. (0–50° C.) | Slurry Temp. (50–85° C.) | Time at Slurry Temp. (5–60 min.) | Methyl Ethyl Ketone Temp. (at least 65° C.) | Percent Light Transmission |
|---|---|---|---|---|---|
| I | 30 | 70 | 20 | 70 | 96 |
| II | 50 | 70 | 20 | 70 | 95 |
| III | 30 | 81–84 | 20 | 70 | 97 |
| IV | 30 | 70 | 5 | 70 | 95.5 |
| Control A | 30 | 30 | 20 | 70 | 87 |
| Control B | 60 | 70 | 20 | 70 | 91 |
| Control C | 30 | 70 | 95 | 70 | 86 |
| Control D | 70 | 70 | 20 | 70 | 91 |

[1] The underlined conditions are outside the scope of the process of the invention.

In order to obtain consistently haze-free vinylidene chloride copolymer solutions which give consistently clear (free from blush) coatings on transparent regenerated cellulose films, it is evident from the examples that the following critical limitations must be adhered to:

(1) The initial toluene temperature must be maintained from 0° to 50° C.

(2) The slurry temperature must be maintained between 60° and 85° C.

(3) The slurry should be maintained at the temperature specified in (2) above for a minimum of 5 minutes and not over one hour before adding methyl ethyl ketone.

(4) The methyl ethyl ketone should be added at a temperature of at least 65° C. (the maximum temperature being the boiling point, at atmospheric pressure 79.6° C.).

Other chraacteristics of the process that are important are as follows:

(1) The preferred range of methyl ethyl ketone/toluene proportions is from 70/30 to 60/40.

(2) The final solution should be agitated and re-circulated for at least 5 minutes before being used as a coating on regenerated cellulose film.

(3) The percent of copolymer in the ultimate solution in methyl ethyl ketone and toluene should be from 10% to 18%.

Although a copolymer of vinylidene chloride with the monomer, acrylonitrile, has been shown in the examples and is preferred in the process, other monomers polymerizable with vinylidene chloride may be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, glycidyl methacrylate, chloroethyl methacrylate, 2 - nitro - 2 - methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, methylene diethyl malonate, isopropenyl acetate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C<$ group. The most useful ones fall within the general formula

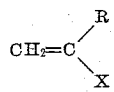

where R may be hydrogen, a halogen or a saturated aliphatic radical and X is selected from one of the following groups: —Cl, —Br, —F, —CN, —$C_6H_5$

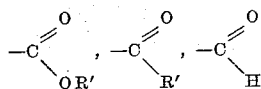

—$OC_6H_5$, —$CONH_2$, —CONH—R, and —$CONR'_2$ in which R' is alkyl.

The coating solutions prepared by the present invention may be applied in accordance with any known coating technique. They may be applied by passing the film through baths of the coating solution in a continuous manner or in a batch manner. Coatings may also be sprayed onto the film, or applied manually by brushing or the like.

The preferred base material, upon which the solutions are applied, is regenerated cellulose film. However, other base materials may be used including paper, films of cellulose acetate, cellulose propionate, cellulose acetatebutyrate, ethyl cellulose, hydroxyethyl cellulose, hydroxypropyl cellulose, carboxymethyl cellulose, the polyesters such as polyethylene terephthalate, etc.

The coated materials are used advantageously as packaging materials for foods, cigarettes and the like. They provide flexible, strong materials of improved heat-seal strength, durability and flexibility, that can be easily converted to packages. The coating does not detract from the transparency of the base material. Because of these superior properties the coated films are outstanding as a vacuum and pressure packaging material, e.g., for packaging of luncheon meats, cheese, nuts, etc.

As many widely different embodiments can be made without departing from the scope of this invention, it is understood that the invention is not limited except as defined in the appended claims.

What is claimed is:

1. A process for preparing a coating composition which comprises forming a slurry in toluene of a copolymer obtained from 80–95% vinylidene chloride and 5–20% of at least one other monoethylenically unsaturated monomer at a temperature of 0° C.–50° C.; heating said slurry to a temperature of 60° C.–85° C.; maintaining said slurry at a temperature of 60° C.–85° C. for 5–60 minutes; adding to said slurry methyl ethyl ketone at a temperature between 65° C. and the boiling point of methyl ethyl ketone and agitating the resulting mixture.

2. A process for preparing a coating composition which comprises forming a slurry in toluene of a copolymer obtained from 80–95% vinylidene chloride and 5–20% of at least one other monoethylenically unsaturated monomer at a temperature of about 30° C.; heating said slurry to a temperature of 70° C.–80° C.; maintaining said slurry at a temperature of 70° C.–80° C. for about 20 minutes; adding to said slurry methyl ethyl ketone at a temperature between 65° C. and the boiling point of methyl ethyl ketone and agitating the resulting mixture for at least 5 minutes.

3. A process for preparing a coating composition which comprises forming a slurry in toluene of a copolymer obtained from 80–95% vinylidene chloride and 5–20% of acrylonitrile at a temperature of 0° C.–50° C.; heating said slurry to a temperature of 60° C.–85° C.; maintaining said slurry at a temperature of 60° C.–85° C. for 5–60 minutes; adding to said slurry methyl ethyl ketone at a temperature between 65° C. and the boiling point of methyl ethyl ketone and agitating the resulting mixture.

4. A process for preparing a coating composition which comprises forming a slurry in toluene of a copolymer obtained from 80–95% vinylidene chloride and 5–20% of acrylonitrile at a temperature of about 30° C.; heating said slurry to a temperature of 70° C.–80° C.; maintaining said slurry at a temperature of 70° C.–80° C. for about 20 minutes; adding to said slurry methyl ethyl ketone at a temperature between 65° C. and the boiling point of methyl ethyl ketone and agitating the resulting mixture for at least 5 minutes.

5. A process for preparing a coating composition which comprises forming a slurry in toluene of a copolymer obtained from 91.5% vinylidene chloride and 8.5% of acrylonitrile at a temperature of about 30° C.; heating said slurry to a temperature of 70° C.–80° C.; maintaining said slurry at a temperature of 70° C.–80° C. for about 20 minutes; adding to said slurry methyl ethyl ketone at a temperature between 65° C. and the boiling point of methyl ethyl ketone and agitating the resulting mixture for at least 5 minutes.

References Cited in the file of this patent

UNITED STATES PATENTS 2,606,894     Pitzl _____ Aug. 12, 1952

FOREIGN PATENTS 623,237     Great Britain _____ May 13, 1949
454,975     Canada _____ Mar. 8, 1949